US011922706B2

(12) United States Patent
Herbert et al.

(10) Patent No.: US 11,922,706 B2
(45) Date of Patent: Mar. 5, 2024

(54) SYSTEMS AND METHODS FOR DYNAMIC ATTENTION AREA

(71) Applicant: Veoneer US LLC, Southfield, MI (US)

(72) Inventors: Thomas James Herbert, Fenton, MI (US); Tom Toma, Commerce Township, MI (US); Hans Herbertsson, Borås (SE)

(73) Assignee: VEONEER US, LLC, Southfield, MI (US)

( * ) Notice: Subject to any disclaimer, the term of this patent is extended or adjusted under 35 U.S.C. 154(b) by 0 days.

(21) Appl. No.: 17/577,136

(22) Filed: Jan. 17, 2022

(65) Prior Publication Data
US 2023/0230396 A1 Jul. 20, 2023

(51) Int. Cl.
  *G06V 20/56* (2022.01)
  *G06V 20/58* (2022.01)
  *G06V 20/59* (2022.01)

(52) U.S. Cl.
  CPC ................... *G06V 20/597* (2022.01)

(58) Field of Classification Search
  None
  See application file for complete search history.

(56) References Cited

U.S. PATENT DOCUMENTS

| 2014/0204193 | A1* | 7/2014 | Zhang | G06V 40/18 |
| | | | | 348/78 |
| 2015/0154461 | A1 | 6/2015 | Kitaura et al. | |
| 2021/0357670 | A1 | 11/2021 | Wu et al. | |
| 2021/0370956 | A1* | 12/2021 | Yamauchi | G06V 20/56 |
| 2021/0374443 | A1* | 12/2021 | Edwards | A61B 5/18 |

FOREIGN PATENT DOCUMENTS

| DE | 102016223909 A1 | 6/2018 |
| WO | WO-2021209426 A1 | 10/2021 |

OTHER PUBLICATIONS

International Search Report and Written Opinion for International Application No. PCT/US2023/010678 dated Apr. 6, 2023.

* cited by examiner

*Primary Examiner* — Samuel D Fereja

(57) ABSTRACT

A driver monitoring system of a vehicle includes: a camera configured to capture an image of a driver on a driver's seat within a passenger cabin of the vehicle; a gaze module configured to determine a gaze vector based on a direction of pupils of the driver in the image; an area module configured to determine an area on a vertical plane in front of the driver based on a road in front of the vehicle; a location module configured to determine a location on the vertical plane where the gaze vector intersects the vertical plane; and a monitor module that determines whether the location on the vertical plane where the gaze vector intersects the vertical plane is within the area on the vertical plane.

20 Claims, 10 Drawing Sheets

SYSTEMS AND METHODS FOR DYNAMIC ATTENTION AREA

FIELD

The present disclosure relates to vehicle driver monitoring systems and methods and more particularly to systems and methods for dynamically adjusting an attention zone of a driver.

BACKGROUND

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Driver monitoring systems of vehicles include a sensor (e.g., a camera, radar, time of flight (TOF) sensor, etc.) that faces the driver of a vehicle. The sensor may include a lens (e.g., in the example of a camera) and/or a serializer/deserializer. Data from the camera are used during driving to monitor for alertness of the driver. Driver monitoring systems may also determine how actively the driver is paying attention to the environment in front of the vehicle.

The sensor may be mounted within the interior of the passenger cabin of the vehicle and facing the driver and/or other occupants. Data from the sensor may be used to monitor driver fatigue. When fatigue or a lack of attention of the driver is detected, the driver may be alerted.

SUMMARY

In a feature, a driver monitoring system of a vehicle includes: a camera configured to capture an image of a driver on a driver's seat within a passenger cabin of the vehicle; a gaze module configured to determine a gaze vector based on a direction of pupils of the driver in the image; an area module configured to determine an area on a vertical plane in front of the driver based on a road in front of the vehicle; a location module configured to determine a location on the vertical plane where the gaze vector intersects the vertical plane; and a monitor module that determines whether the location on the vertical plane where the gaze vector intersects the vertical plane is within the area on the vertical plane.

In further features, the area module is configured to move the area on the vertical plane based on the road in front of the vehicle.

In further features, the area module is configured to adjust a size of the area based on the road in front of the vehicle.

In further features, the area module is configured to selectively move a left vertical edge of the area based on the road in front of the vehicle.

In further features, the area module is configured to selectively move the left vertical edge of the area in response to one or more lanes joining with a present lane of the vehicle to the left of the present lane of the vehicle.

In further features, the area module is configured to selectively move the left vertical edge of the area when the road in front of the vehicle curves to the left from the perspective of the driver.

In further features, the area module is configured to selectively move a right vertical edge of the area based on the road in front of the vehicle.

In further features, the area module is configured to selectively move the right vertical edge of the area in response to one or more lanes joining with a present lane of the vehicle to the right of the present lane of the vehicle.

In further features, the area module is configured to selectively move the right vertical edge of the area when the road in front of the vehicle curves to the right from the perspective of the driver.

In further features, a boundary module is configured to determine boundaries of the road in front of the vehicle, where the area module is configured to determine the area on the vertical plane in front of the driver based on at least one of the boundaries of the road in front of the vehicle.

In further features, the boundary module is configured to determine the boundaries of the road in front of the vehicle from an image of the road in front of the vehicle captured using a camera of the vehicle.

In further features, the area module is configured to move the area on the vertical plane based on at least one of the boundaries of the road in front of the vehicle.

In further features, the area module is configured to adjust a size of the area based on at least one of the boundaries of the road in front of the vehicle.

In further features, a road module is configured to determine a curvature of the road in front of the vehicle based on a present location and a present heading of the vehicle, and the area module is configured to determine the area on the vertical plane in front of the driver based on the curvature of the road in front of the vehicle.

In further features, the area module is configured to move the area on the vertical plane based on the curvature of the road in front of the vehicle.

In further features, the area module is configured to adjust a size of the area based on the curvature of the road in front of the vehicle.

In a feature, a driver monitoring method for a vehicle includes: using a camera, capturing an image of a driver on a driver's seat within a passenger cabin of the vehicle; determining a gaze vector based on a direction of pupils of the driver in the image; determining an area on a vertical plane in front of the driver based on a road in front of the vehicle; determining a location on the vertical plane where the gaze vector intersects the vertical plane; and determining whether the location on the vertical plane where the gaze vector intersects the vertical plane is within the area on the vertical plane.

In further features, determining the area includes moving the area on the vertical plane based on the road in front of the vehicle.

In further features, determining the area includes adjusting a size of the area based on the road in front of the vehicle.

In further features, determining the area includes, based on the road in front of the vehicle, at least one of (a) moving a left vertical edge of the area and (b) moving a right vertical edge of the area.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Driver monitoring systems (DMS) of vehicles determine whether a gaze of a driver of a vehicle is within an area to determine whether the driver's attention is on the road in front of the vehicle. The area may be a fixed predetermined area. The determination of whether the gaze is within the area may be disabled when a torque on a steering motor is greater than a predetermined torque or a magnitude of a steering wheel angle is greater than a predetermined angle. The vehicle may be turning or navigating a curve in a road when the torque is greater than the predetermined torque or the magnitude of the steering wheel angle is greater than the predetermined angle.

The present application involves selectively and dynamically varying the area based on a road in front of the vehicle. For example, a module may move the area based on a curvature of the road in front of the vehicle. Additionally or alternatively, the module may adjust a size of the area when one or more road conditions are present, such as a curve, merging, etc. Varying the area allows the gaze of the driver to be monitored for inattention while the vehicle is turning, navigating a curve, and in other situations. Driver attention lefwardly or rightwardly may also be used to indicate attention, such as when entering a highway, merging into a lane, changing lanes, etc.

While the example of a land vehicle and a road in front of a vehicle is described, the present application is also applicable to airborne vehicles (e.g., airplanes), water based vehicles (e.g., boats), and vehicles that travel on a combination of two or more of land, water, and air, and vertical planes in front of such vehicles.

Figure 1:
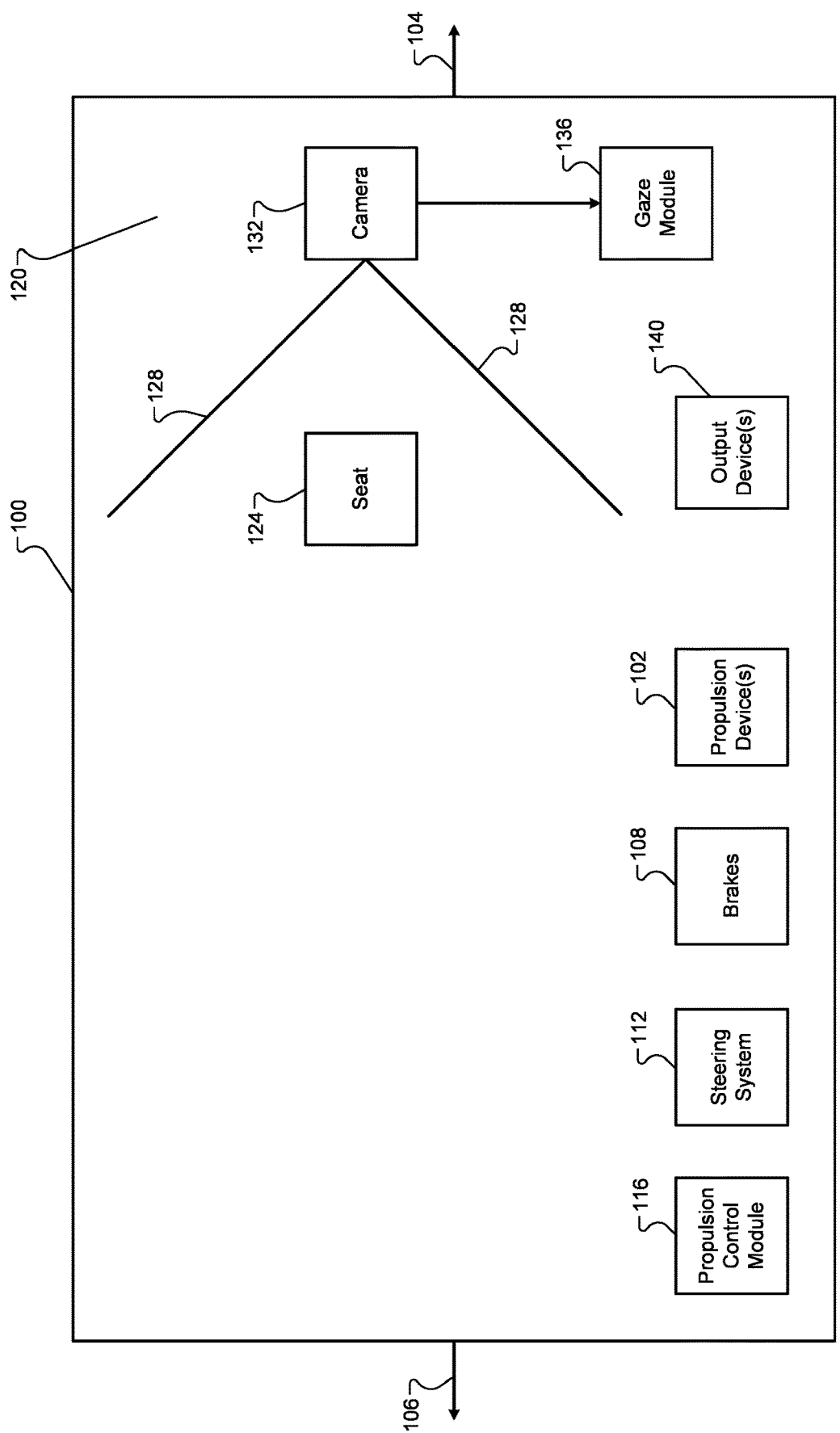
FIG. 1 is a functional block diagram of an example implementation of a vehicle.

FIG. 1 is a functional block diagram of an example vehicle 100 including one or more propulsion devices. The vehicle 100 may be a conventional vehicle including an internal combustion engine, an electric vehicle including one or more electric motors not including an internal combustion engine, a hybrid vehicle including an electric motor and an internal combustion engine, or another suitable type of vehicle. The vehicle 100 may be an autonomous vehicle, a non-autonomous vehicle, or a semiautonomous vehicle. The vehicle 100 may be a ride share vehicle or may be a non-shared vehicle.

The vehicle 100 includes one or more propulsion devices 102, such as at least one of an electric motor and an internal combustion engine, that generate propulsion torque that is used to propel the vehicle 100. Forward and backward directions of the vehicle 100 are illustrated by arrows 104 and 106. The vehicle 100 includes mechanical (friction) brakes 108 that decelerate the vehicle 100 when actuated. The vehicle 100 includes a steering system 112 that steers the vehicle 100 when actuated. The steering system 112 may be, for example, an electric power steering system or another suitable type of steering system.

A propulsion control module 116 controls the steering system 112, the brakes 108, and the propulsion device(s) 102. The propulsion control module 116 may control positive torque output from the propulsion device(s) 102 based on at least one of (a) an accelerator pedal position and (b) autonomous or semiautonomous driving input. The propulsion control module 116 may control actuation of the brakes 108 based on at least one of (a) a brake pedal position and (b) autonomous or semiautonomous driving input. The propulsion control module 116 may control actuation of the steering system 112 based on at least one of (a) a steering wheel angle and (b) autonomous or semiautonomous driving input. For example, the propulsion control module 116 may actuate the steering system 112 to maintain the vehicle 100 between lane lines of a present lane.

The vehicle 100 includes a passenger cabin 120. A driver's seat 124 is disposed within the passenger cabin 120. While only the driver's seat 124 is shown for simplicity, one or more additional seats may also be disposed within the passenger cabin 120.

The driver's seat 124 is disposed within a field of view (FOV) 128 of a camera 132. While an example horizontal FOV is shown, the FOV 128 may be greater than or lesser than the example FOV shown. Because the driver's seat 124 is disposed within the FOV 128, a portion of a driver (at least including eyes of the driver) sitting on the driver's seat 124 is captured in images captured by the camera 132.

As discussed further below, a gaze module 136 identifies eyes of the driver and pupils of the eyes, respectively. The gaze module 136 determines a gaze vector indicating a direction of the pupils of the driver based on the (fixed) position of the camera 132 and the direction of the pupils. The gaze vector is used to determine whether the driver is looking within a driver monitoring system (DMS) area while the vehicle is moving in the forward direction. The DMS area is an area on a vertical plane in front of the vehicle 100. While the example of the camera 132 is provided, the present application is also applicable to other types of sensors, such as radar, time of flight (TOF) and other types of driver monitoring sensors.

Figure 2:
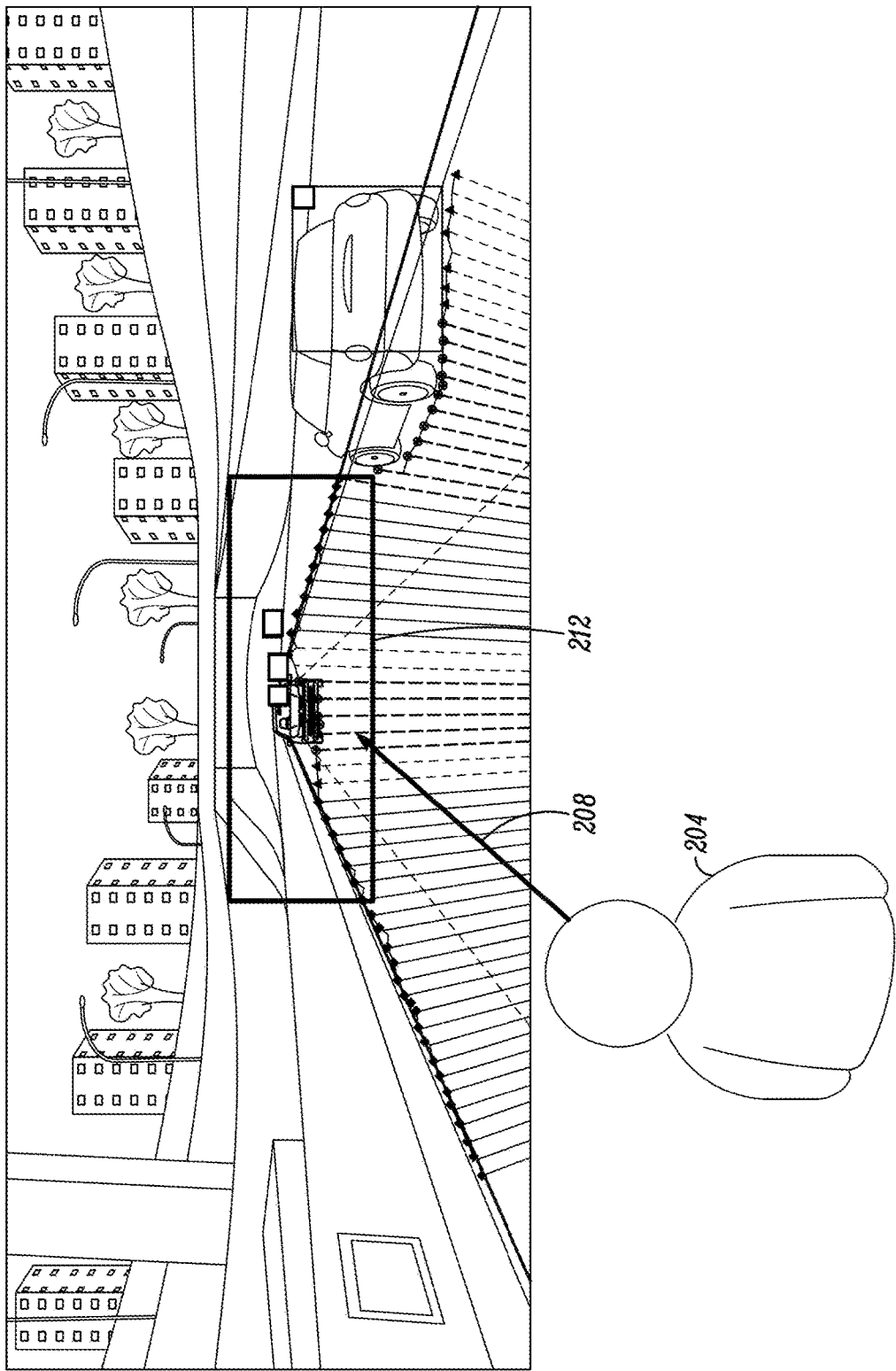
FIG. 2 includes an example illustration of a driver and a gaze vector of the driver and a fixed area.

FIG. 2 includes an example illustration of a driver 204 and a gaze vector 208 determined by the gaze module 136 based on the direction of pupils of eyes, respectively, of the driver 204. An example DMS area 212 is illustrated. In the example of FIG. 2, the gaze vector 208 intersects the DMS area 212. The gaze of the driver 204 is therefore within the DMS area 212.

The gaze of the driver 204 being outside of the DMS area may indicate that the driver is not monitoring the road in front of the vehicle. A determination that the driver 204 is monitoring the road in front of the vehicle may be a prerequisite to allowing autonomous or semiautonomous driving and/or steering.

As discussed further below, one or more actions may be taken when the gaze of the driver 204 is outside of the DMS area for a first predetermined period. For example, one or more outputs may be generated by one or more output devices 140 (FIG. 1). For example, one or more visual outputs may be visually output via one or more visual output devices (e.g., displays, lights, indicators, etc.). Additionally or alternatively, one or more audible outputs may be audibly output via one or more speakers. Additionally or alternatively, the one or more haptic outputs may be output via one or more vibrating devices (e.g., in steering wheel, in seat, etc.). When the gaze of the driver is outside of the DMS area for a second predetermined period, one or more additional actions may be taken. For example, the propulsion control module 116 may at least one of decrease torque output of the propulsion device(s) 102, apply the brakes 108, and adjust the steering (e.g., to move the vehicle to a shoulder).

The DMS area could be a fixed predetermined area on a vertical plane that is N units of distance (e.g., meters or feet) in front of (more forward than) the vehicle (e.g., the windshield). N may be an integer greater than or equal to zero.

Under some circumstances, however, the driver may intentionally look outside of a fixed DMS area (e.g., 212) while paying attention to the road in front of the vehicle. For example, the driver may look outside of the fixed DMS area when the road in front of the vehicle curves, such as for approximately 360 exit and entrance ramps, roundabouts, other curves in the road, when a lane merges into another lane, when one or more lanes come together with the present lane of the vehicle, and in other situations. This may cause unnecessary alerts to be output to the driver and/or action to be taken unnecessarily.

Figure 3:
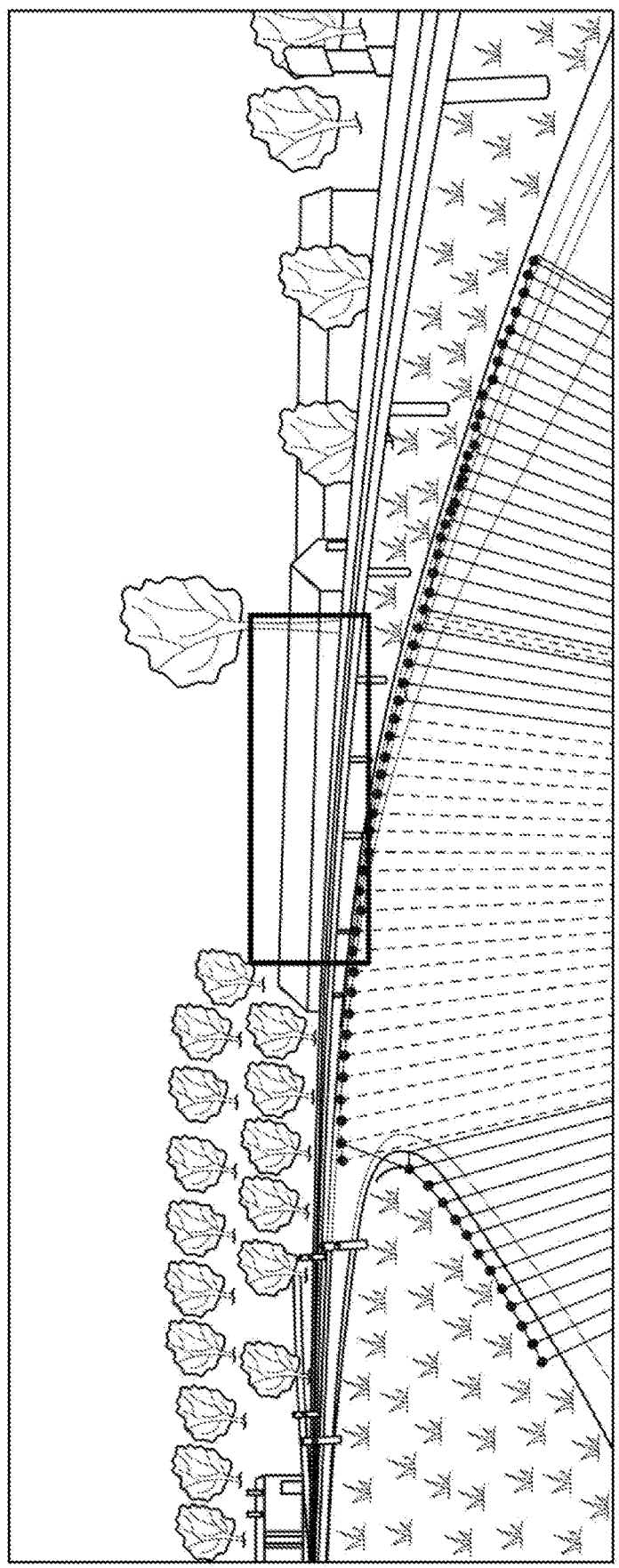
FIG. 3 includes an example illustration of the fixed DMS area with a curve in the road.

For example, FIG. 3 includes an example illustration of the fixed DMS area 212 with a curve in the road. As illustrated, the driver may properly look at the road outside of the fixed DMS area 212.

The present application involves dynamically varying one or more attributes of the DMS area. For example, lane and/or road boundaries may be identified based on images captured in front of the vehicle 100. When a lane and/or road boundary curve occurs, the DMS area may be moved in the direction of the curve. Additionally or alternatively, the left and/or right edges of the DMS area may be moved outwardly to increase the DMS area. For example, one (e.g., in the direction of the curve) or both of the left and right edges of the DMS area may both be extended outwardly. The present application describes an intelligent system and method of moving and/or varying the DMS area based on a projected trajectory of the vehicle system determined based on information from one or more cameras and/or sensors of the vehicle.

Figure 4:
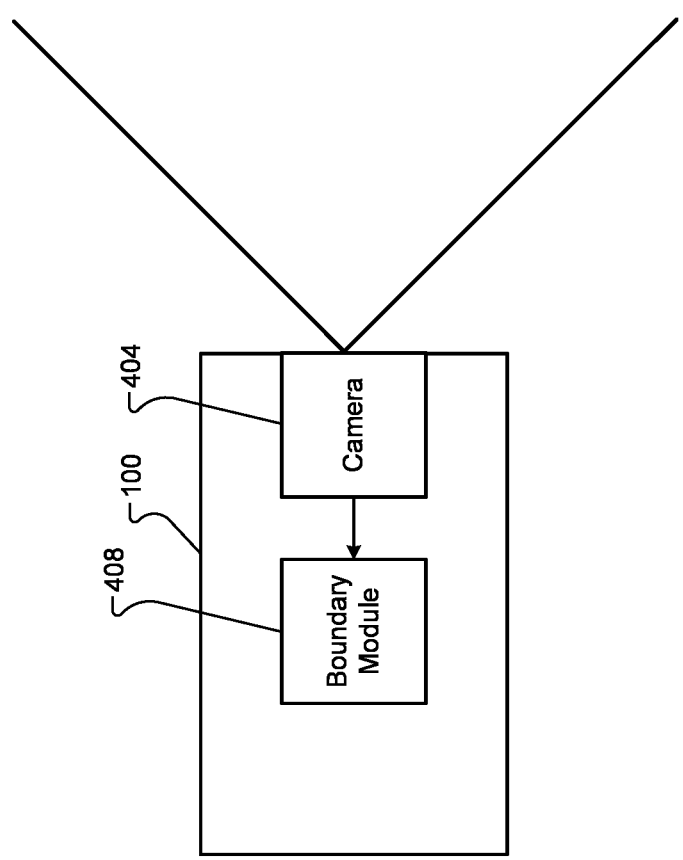
FIG. 4 is a functional block diagram of a portion of a vehicle.

FIG. 4 is a functional block diagram of a portion of the vehicle 100. The vehicle includes one or more forward facing cameras, such as forward facing camera 404. Forward facing cameras may be disposed, for example, behind a rearview mirror of the vehicle, on a front fascia of the vehicle, above a windshield of the vehicle, and/or in other suitable forward facing locations. While an example FOV of the camera 404 is shown, the FOV in front of the vehicle 100 may be greater than or lesser than the example FOV shown.

A boundary module 408 receives the images of in front of the vehicle 100 and identifies boundaries of a road in front of the vehicle 100. The boundary module 408 may, for example, identify boundaries of the road using an object (e.g., line) detection algorithm. For example, as shown in FIG. 3, the boundary module 408 may identify points on the left and right boundaries of the road in the images and connect the points to determine the left and right boundaries of the road. The boundary module 408 may fit an equation to the points on the left boundary and fit an equation to the points of the right boundary of the road using a line fitting algorithm. The boundaries of the road may be used to adjust the DMS area as discussed below.

Figure 5:
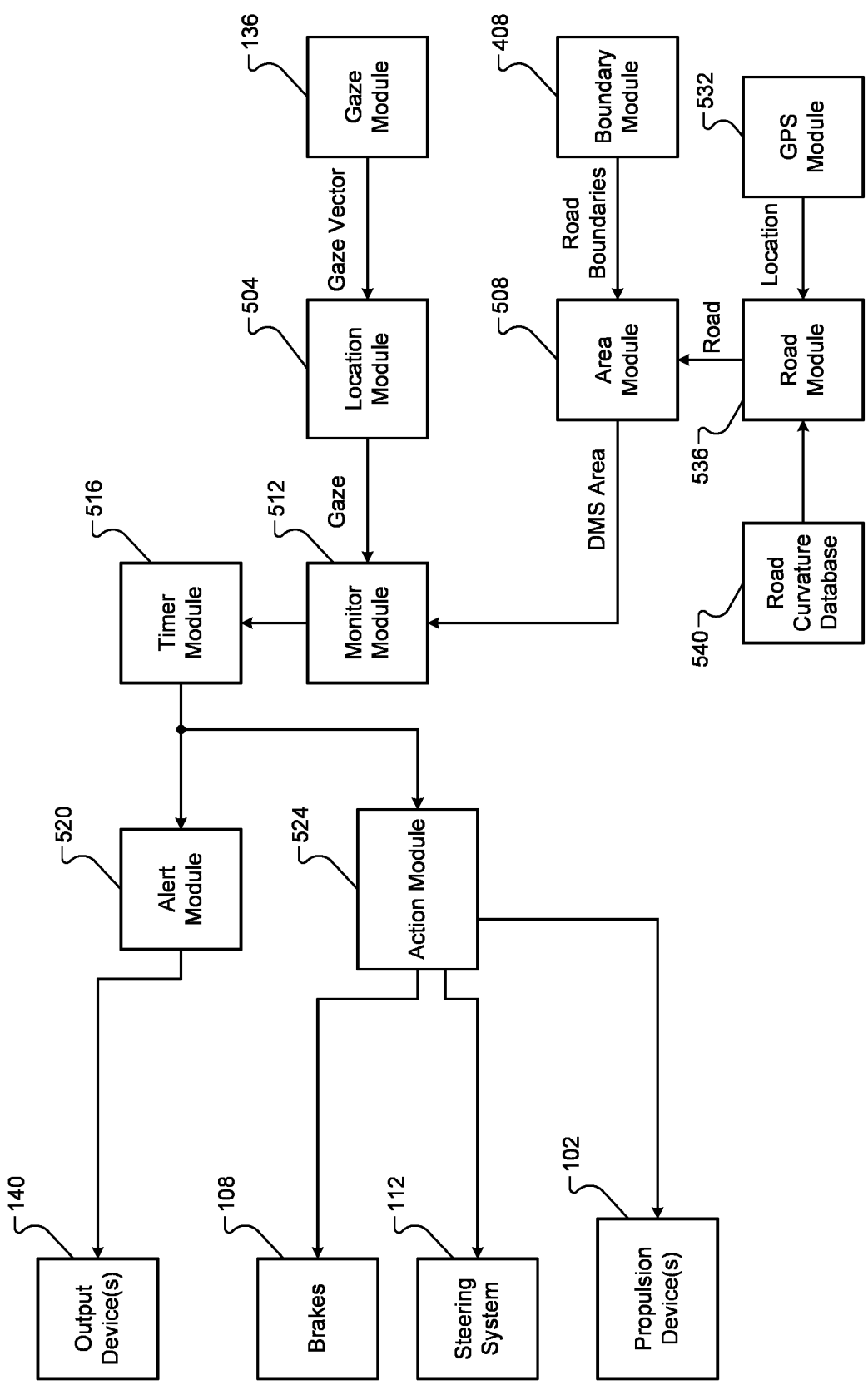
FIG. 5 is a functional block diagram of a driver monitoring system (DMS) of a vehicle.

FIG. 5 is a functional block diagram of a driver monitoring system (DMS) of the vehicle. The gaze module 136 determines the (present) gaze vector for the driver based on the direction of the pupils of the driver. The boundary module 408 determines the boundaries of the road in front of the vehicle 100.

A location module 504 determines the location (e.g., horizontal and vertical coordinates) of where the gaze vector of the driver intersects the vertical plane on which the DMS area lies. For example, the gaze vector may be represented by a three dimensional linear equation, and the location may be determined by the location module 504 based on the gaze vector and the location of the vertical plane.

An area module 508 determines the DMS area on the vertical plane based on the road boundaries and/or one or more characteristics of the road in front of the vehicle. For example, when the road boundaries in front of the vehicle are straight (e.g., the road boundaries both have less than or equal to a predetermined order (e.g., first or second order) polynomial equations), the area module 508 may set the DMS area to a predetermined DMS area of a predetermined length and width on the vertical plane. When one or more of the boundaries in the road in front of the vehicle is curved (e.g., at least one of the road boundaries has greater than the predetermined order polynomial equations), however, the area module 508 may adjust the DMS.

For example, the area module 508 may center the DMS area having the predetermined area between the boundaries of the road. The area module 508 may move the DMS area to the left when the road curves to the left and move the DMS area to the right when the road curves to the right.

Additionally or alternatively, the area module 508 may position a bottom left corner of the DMS area on approximately the left boundary of the road on the vertical plane and position a bottom right corner of the DMS area on approximately the right boundary of the road. The top right corner of the DMS area is vertically above (on the vertical plane) the bottom right corner by a predetermined distance, and the top left corner is vertically above (on the vertical plane) the bottom left corner by the predetermined distance. The top left corner, the top right corner, the bottom left corner, and the bottom right corner may form a rectangular DMS area. In various implementations, the area module 508 may position the corners of the DMS area outside of the associated road boundaries, such as by a predetermined distance.

When one or more lanes join the present lane of the vehicle from the left, the area module 508 may move the left vertical edge of the DMS area to the left boundary of the left most lane. This extends the DMS area to the left. Similar applies to lanes added to the right where the area module 508 extends the right vertical edge of the DMS area to the right boundary of the right most lane.

When the present lane of the vehicle 100 is to merge with one or more lanes to the left of the vehicle 100, the area module 508 may move the right vertical edge of the DMS area to the left to the right boundary of the right most lane. This moves the right vertical edge of the DMS area to the left. Similar applies to when the present lane of the vehicle 100 is to merge with one or more lanes to the right. In this example, the area module 508 moves the left vertical edge of the DMS area to the left boundary of the left most lane.

While example situations are provided, the present application is also applicable to other adjustments of the DMS area based on the road in front of the vehicle.

In various implementations, a global positioning system (GPS) module 532 may determine a present location of the vehicle 100 using signals from satellites of a GPS. The GPS module 532 may determine a heading of the vehicle 100 based on a change in the present location relative to a previous present location of the vehicle 100.

A road module 536 determines a road curvature of the road in front of the vehicle 100 using a road curvature database 540 based on the present location and heading of the vehicle 100. The road curvature database 540 may include a lookup table of road curvatures indexed by location and heading. In various implementations, the road module 536 may receive the present location and heading of the vehicle 100 from a mobile device (e.g., a cellular phone) connected to the vehicle 100, such as via a Universal Serial Bus (USB) port.

The area module 508 may set the DMS area based on the road curvature from the road module 536. For example, the area module 508 may set the DMS area to the predetermined fixed area when the road curvature is less than a predetermined curvature. The area module 508 may adjust the DMS area, such as described above, when the road curvature is greater than a predetermined curvature (e.g., angle).

A monitor module 512 determines whether the location where the gaze vector intersects the vertical plane of the DMS area is within the DMS area. When the location is within the DMS area, the monitor module 512 resets a timer value of a timer module 516. When the location is outside of the DMS area, the monitor module 512 increments the timer value (e.g., by 1). As such, the timer value tracks the period that the gaze of the driver has been outside of the DMS area.

An alert module 520 outputs one or more alerts of inattention to the driver via the output device(s) 140 when the timer value is greater than a first predetermined value. In other words, the alert module 520 outputs one or more alerts to the driver when the period that the gaze of the driver has been outside of the DMS area is greater than a first predetermined period. The first predetermined period may be, for example, approximately 3 seconds or another suitable period.

An action module 524 may take one or more actions when the timer value is greater than a second predetermined value. In other words, the action module 524 may take one or more actions when the period that the gaze of the driver has been outside of the DMS area is greater than a second predetermined period. The second predetermined period is greater than the first predetermined period and may be, for example, approximately 6 seconds or another suitable period. For example, the action module 524 may at least one of (a) decrease torque output of the propulsion device(s) 102, (b) actuate (apply) the brakes 108, and (c) adjust steering of the vehicle 100.

Figure 6:
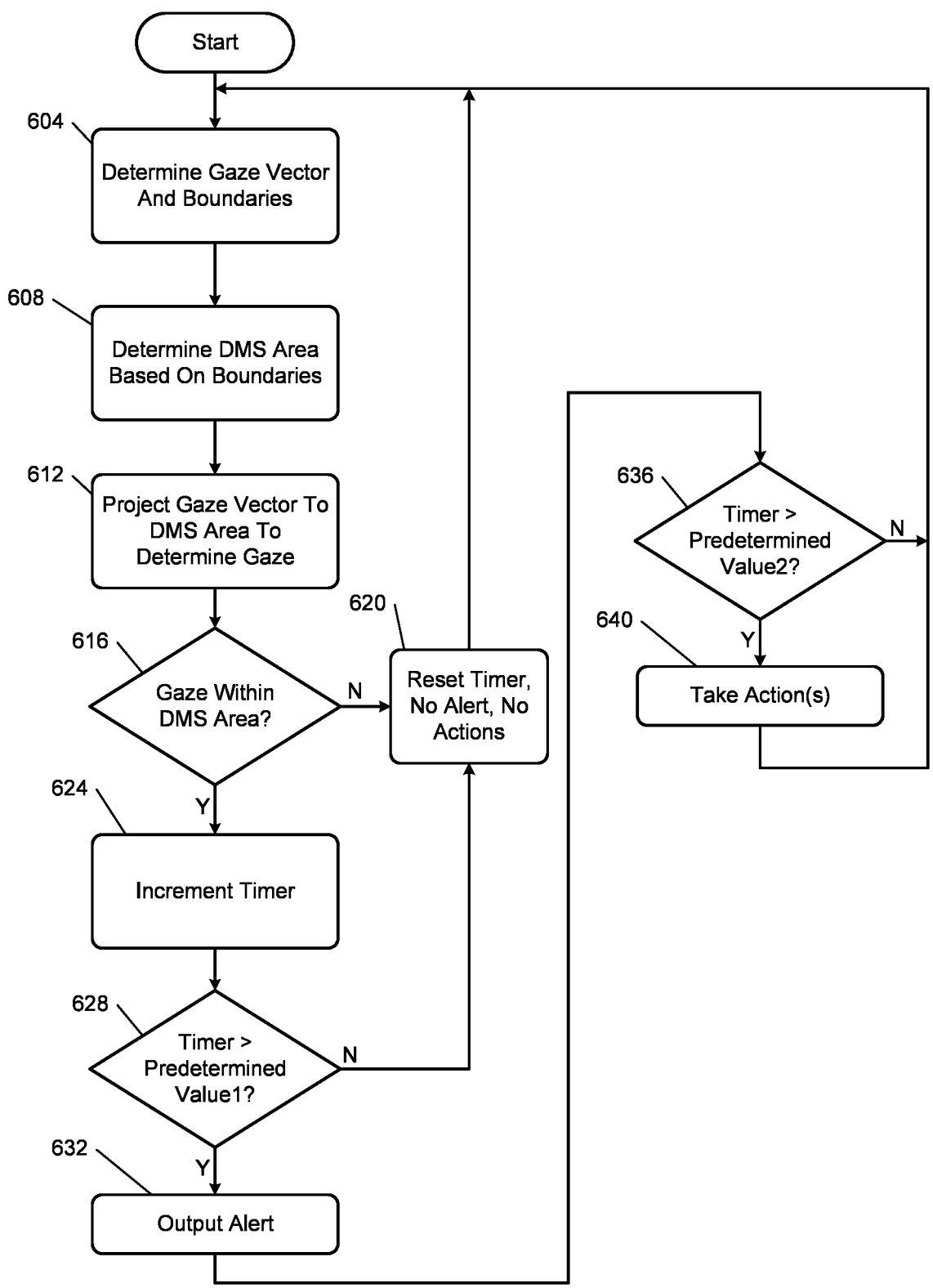
FIG. 6 is a flowchart depicting an example method of setting a DMS area and selectively taking one or more actions based on a gaze of a driver.

FIG. 6 is a flowchart depicting an example method of setting the DMS area and selectively taking one or more actions. Control begins with 604 when the vehicle 100 is moving in the forward direction. At 604, the gaze module 136 receives an image from the camera 132 and determines a gaze vector for the driver based on a direction of the pupils in the image and the predetermined location of the camera 132. Also at 604, the boundary module 408 receives an image from the camera 404 and determines the boundaries of the road in front of the vehicle using the image.

At 608, the area module 508 determines the DMS area based on the road boundaries as discussed above. At 612, the location module 504 determines the location where the gaze vector of the driver intersects the vertical plane of the DMS area. At 616, the monitor module 512 determines whether the location is within the DMS area. In other words, the monitor module 512 determines whether the gaze of the driver is within the DMS area. If 616 is false, the monitor module 512 resets the timer value (e.g., to zero) at 620. No alerts may be output and no actions may be taken at 620, and control returns to 604. If 616 is true, the monitor module 512 increments the timer value (e.g., by 1) at 624.

At 628, the alert module 520 determines whether the timer value is greater than the first predetermined value (Predetermined value 1). In other words, the alert module 520 determines whether the period since the driver's gaze left the DMS area is greater than the first predetermined period. If 628 is false, control transfers to 620, as discussed above. If 628 is true, control continues with 632.

At 632, the alert module 520 outputs one or more alerts via the output device(s) 140. This alerts the driver to the lack of attention to the road (the DMS area) in front of the vehicle 100. Control continues with 636.

At 636, the action module 524 determines whether the timer value is greater than the first predetermined value (Predetermined value 2). In other words, the action module 524 determines whether the period since the driver's gaze left the DMS area is greater than the second predetermined period. If 636 is false, control returns to 604 for a next set of images. If 636 is true, the action module 524 takes one or more actions at 640, such as at least one of decreasing torque output of the propulsion device(s) 102, applying the brakes 108, and steering the vehicle 100. Control returns to 604 for a next set of images. The cameras may output images at a predetermined rate, such as 60 hertz (Hz) or another suitable rate.

Figure 7B:
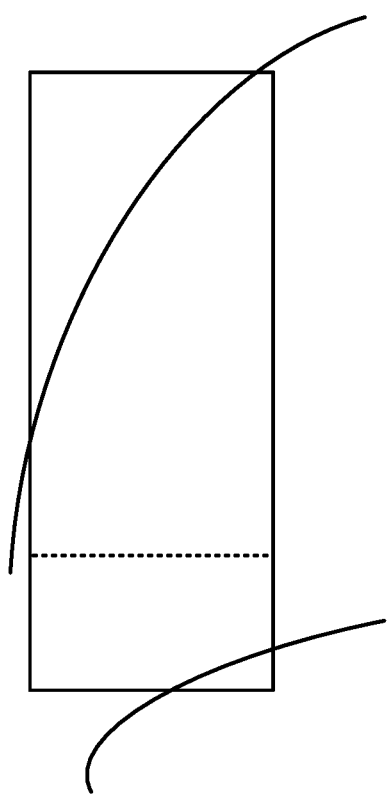
FIG. 7B is an example illustration of an adjusted DMS area for a road with a curve to the left.
Figure 7A:
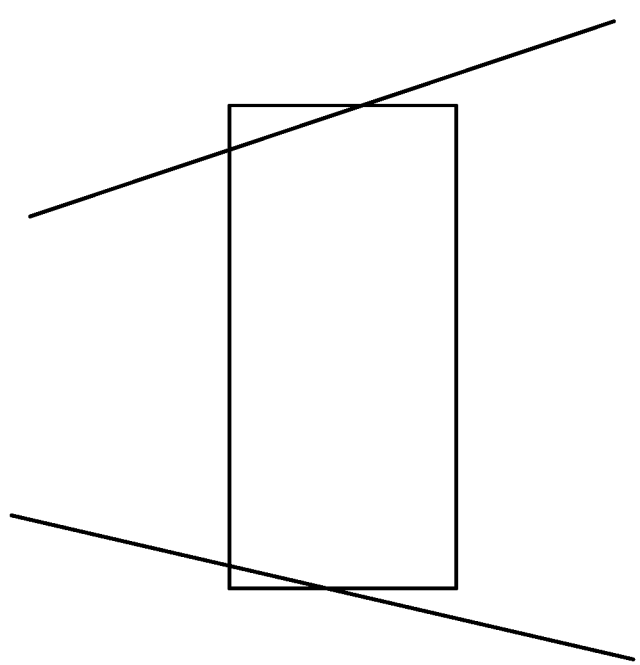
FIG. 7A is an example illustration of a fixed predetermined DMS area for a straight road.

FIG. 7A is an example illustration of a fixed predetermined DMS area for a straight road. FIG. 7B is an example illustration of an adjusted DMS area for a road with a curve to the left. As illustrated the DMS area may be moved to the left and/or enlarged, such as to the left. The fixed predetermined DMS area is illustrated by dashed lines in FIGS. 7B, 8B, 9B, and 10B. Under some circumstances, the fixed DMS area may not even include the most relevant part of the environment in front of the vehicle.

Figure 8B:
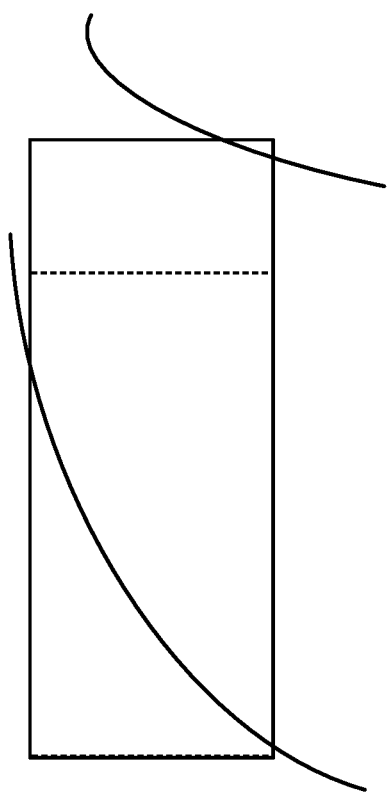
FIG. 8B is an example illustration of an adjusted DMS area for a road with a curve to the right.
Figure 8A:
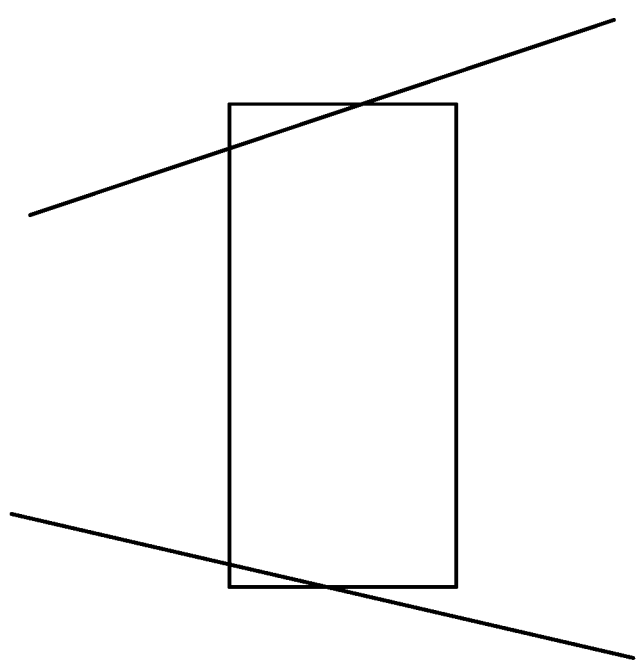
FIG. 8A is an example illustration of the fixed predetermined DMS area for a straight road.

FIG. 8A is an example illustration of the fixed predetermined DMS area for a straight road. FIG. 8B is an example illustration of an adjusted DMS area for a road with a curve to the right. As illustrated the DMS area may be moved to the right and/or enlarged, such as to the right.

Figure 9B:
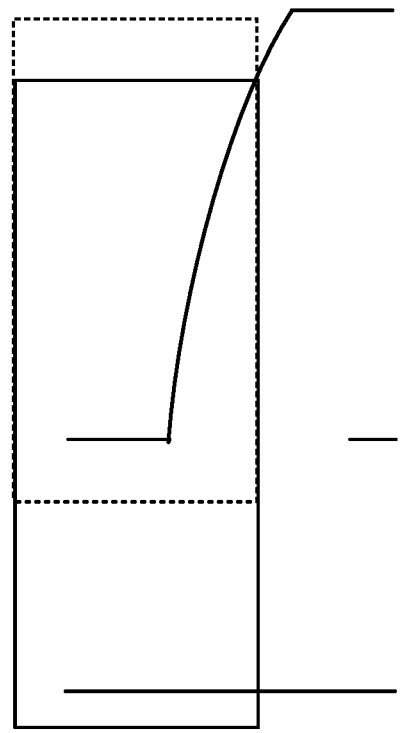
FIG. 9B is an example illustration of an adjusted DMS area for a road where the present lane merges with one or more lanes to the left of the present lane.
Figure 9A:
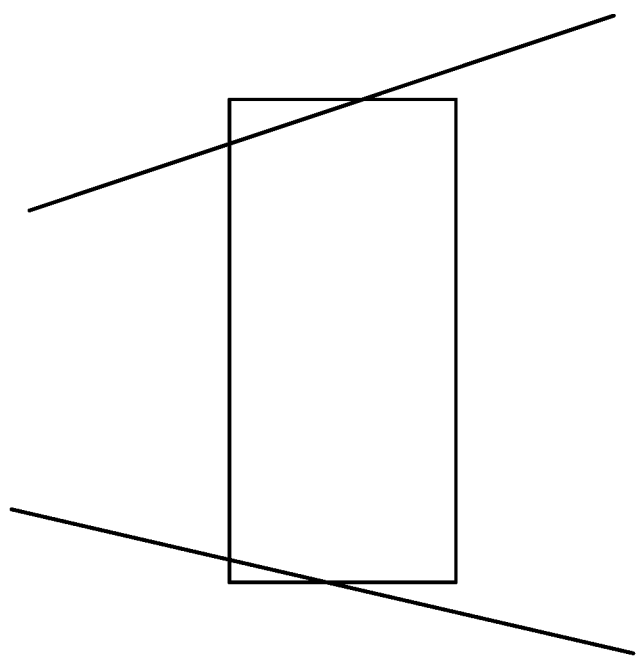
FIG. 9A is an example illustration of the fixed predetermined DMS area for a straight road.

FIG. 9A is an example illustration of the fixed predetermined DMS area for a straight road. FIG. 9B is an example illustration of an adjusted DMS area for a road where the present lane merges with one or more lanes to the left of the present lane. As illustrated the DMS area may be enlarged initially and later the right vertical edge may be moved to the left.

Figure 10B:
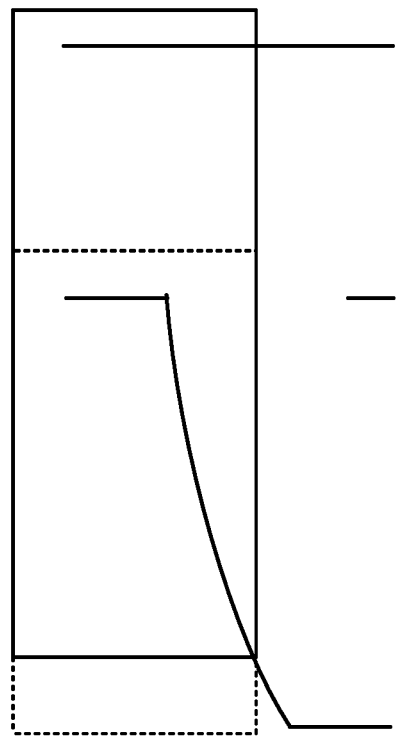
FIG. 10B is an example illustration of an adjusted DMS area for a road where the present lane merges with one or more lanes to the right of the present lane.
Figure 10A:
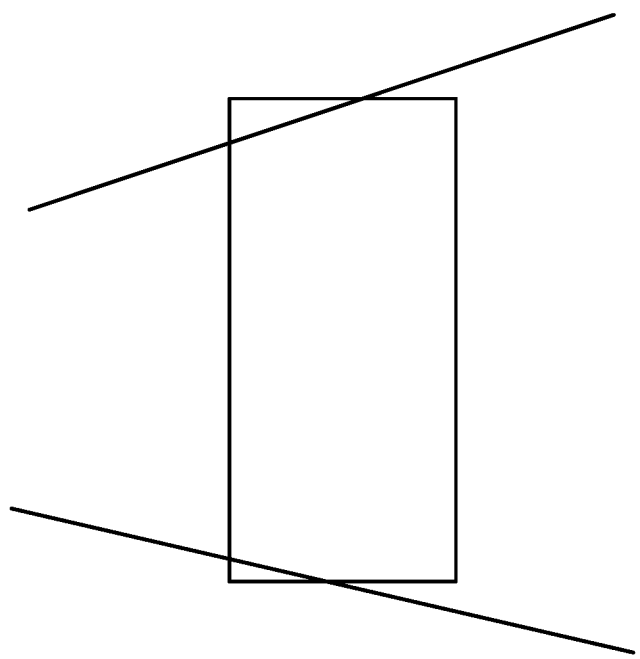
FIG. 10A is an example illustration of the fixed predetermined DMS area for a straight road.

FIG. 10A is an example illustration of the fixed predetermined DMS area for a straight road. FIG. 10B is an example illustration of an adjusted DMS area for a road where the present lane merges with one or more lanes to the right of the present lane. As illustrated the DMS area may be enlarged initially and later the left vertical edge may be moved to the right.

The example illustrations and scenarios are only examples and the same principles apply to other situations, such as when the road is bending up (the DMS area would move up) or down (the DMS area would move down) as when approaching an uphill, or an entrance ramp to a horizontally separated highway, or a bridge or tunnel, etc. In the example of uphill, the area module may move the DMS area vertically upwardly or an upper edge of the DMS area vertically upwardly. In the example of downhill, the area module may move the DMS area or a lower edge of the DMS area vertically downwardly.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A driver monitoring system of a vehicle, comprising:
a camera configured to capture an image of a driver on a driver's seat within a passenger cabin of the vehicle;
a gaze module configured to determine a gaze vector based on a direction of pupils of the driver in the image;
an area module configured to determine an area on a vertical plane in front of the driver based on a road in front of the vehicle and to increase a size of the area by moving a vertical edge of the area when the road in front of the vehicle curves from the perspective of the driver;
a location module configured to determine a location on the vertical plane where the gaze vector intersects the vertical plane; and
a monitor module that determines whether the location on the vertical plane where the gaze vector intersects the vertical plane is within the area on the vertical plane,
wherein the area module is further configured to:
when a present lane of the vehicle is to merge with a first one or more lanes to the left of the vehicle, move a right vertical edge of the vehicle to the left to a right boundary of the right most one of the first one or more lanes; and
when the present lane of the vehicle is to merge with a second one or more lanes to the right of the vehicle, move a left vertical edge of the vehicle to the right to a left boundary of the left most one of the first one or more lanes.

2. The driver monitoring system of claim 1 wherein the area module is configured to move the area on the vertical plane based on the road in front of the vehicle.

3. The driver monitoring system of claim 1 wherein the area module is configured to selectively move the left vertical edge of the area based on the road in front of the vehicle.

4. The driver monitoring system of claim 3 wherein the area module is configured to selectively move the left vertical edge of the area in response to one or more lanes joining with a present lane of the vehicle to the left of the present lane of the vehicle.

5. The driver monitoring system of claim 3 wherein the area module is configured to selectively move the left vertical edge of the area when the road in front of the vehicle curves to the left from the perspective of the driver.

6. The driver monitoring system of claim 1 wherein the area module is configured to selectively move the right vertical edge of the area based on the road in front of the vehicle.

7. The driver monitoring system of claim 6 wherein the area module is configured to selectively move the right vertical edge of the area in response to one or more lanes joining with a present lane of the vehicle to the right of the present lane of the vehicle.

8. The driver monitoring system of claim 6 wherein the area module is configured to selectively move the right vertical edge of the area when the road in front of the vehicle curves to the right from the perspective of the driver.

9. The driver monitoring system of claim 1 further comprising a boundary module configured to determine boundaries of the road in front of the vehicle,
wherein the area module is configured to determine the area on the vertical plane in front of the driver based on at least one of the boundaries of the road in front of the vehicle.

10. The driver monitoring system of claim 9 wherein the boundary module is configured to determine the boundaries of the road in front of the vehicle from an image of the road in front of the vehicle captured using a camera of the vehicle.

11. The driver monitoring system of claim 9 wherein the area module is configured to move the area on the vertical plane based on at least one of the boundaries of the road in front of the vehicle.

12. The driver monitoring system of claim 9 wherein the area module is configured to adjust the size of the area based on at least one of the boundaries of the road in front of the vehicle.

13. The driver monitoring system of claim 1 further comprising a road module configured to determine a curvature of the road in front of the vehicle based on a present location and a present heading of the vehicle,
wherein the area module is configured to set the area on the vertical plane in front of the driver based on the curvature of the road in front of the vehicle.

14. The driver monitoring system of claim 13 wherein the area module is configured to move the area on the vertical plane based on the curvature of the road in front of the vehicle.

15. A driver monitoring method for a vehicle, comprising:
using a camera, capturing an image of a driver on a driver's seat within a passenger cabin of the vehicle;
determining a gaze vector based on a direction of pupils of the driver in the image;
determining an area on a vertical plane in front of the driver based on a road in front of the vehicle including increasing a size of the area by moving a vertical edge of the area when the road in front of the vehicle curves from the perspective of the driver;
determining a location on the vertical plane where the gaze vector intersects the vertical plane; and
determining whether the location on the vertical plane where the gaze vector intersects the vertical plane is within the area on the vertical plane,
wherein determining the area includes:
when a present lane of the vehicle is to merge with a first one or more lanes to the left of the vehicle, moving a right vertical edge of the vehicle to the left to a right boundary of the right most one of the first one or more lanes; and
when the present lane of the vehicle is to merge with a second one or more lanes to the right of the vehicle, moving a left vertical edge of the vehicle to the right to a left boundary of the left most one of the first one or more lanes.

16. The driver monitoring method of claim 15 wherein determining the area includes moving the area on the vertical plane based on the road in front of the vehicle.

17. The driver monitoring method of claim 15 wherein determining the area includes, based on the road in front of the vehicle, at least one of (a) moving the left vertical edge of the area, (b) moving the right vertical edge of the area, (c) moving an upper edge of the area, and (d) moving a lower edge of the area.

18. The driver monitoring method of claim 15 wherein determining the area includes selectively moving the left vertical edge of the area when the road in front of the vehicle curves to the left from the perspective of the driver.

19. The driver monitoring method of claim 15 wherein determining the area includes selectively moving the right vertical edge of the area when the road in front of the vehicle curves to the right from the perspective of the driver.

20. The driver monitoring method of claim 15 further comprising determining boundaries of the road in front of the vehicle,
   wherein determining the area includes determining the area on the vertical plane in front of the driver based on at least one of the boundaries of the road in front of the vehicle.

* * * * *